United States Patent
Miyahara et al.

(10) Patent No.: US 7,710,600 B2
(45) Date of Patent: May 4, 2010

(54) IMAGE PROCESSING APPARATUS AND METHOD THEREOF

(75) Inventors: Seiji Miyahara, Kanagawa (JP); Manabu Komatsu, Tokyo (JP); Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 899 days.

(21) Appl. No.: 11/482,328

(22) Filed: Jul. 6, 2006

(65) Prior Publication Data

US 2007/0013927 A1    Jan. 18, 2007

(30) Foreign Application Priority Data

Jul. 6, 2005    (JP) .............................. 2005-198080

(51) Int. Cl.
 *H04N 1/60* (2006.01)
(52) U.S. Cl. .................... 358/1.9; 358/518; 382/162; 382/167
(58) Field of Classification Search ............ None
See application file for complete search history.

(56) References Cited

U.S. PATENT DOCUMENTS

| | | | |
|---|---|---|---|
| 5,181,105 A * | 1/1993 | Udagawa et al. | 358/520 |
| 5,678,135 A | 10/1997 | Fukui et al. | |
| 5,689,590 A | 11/1997 | Shirasawa et al. | |
| 5,786,908 A * | 7/1998 | Liang | 358/518 |
| 5,831,751 A | 11/1998 | Ohneda et al. | |
| 6,005,970 A | 12/1999 | Ohneda et al. | |
| 6,016,359 A * | 1/2000 | Komatsu | 382/162 |
| 6,137,595 A | 10/2000 | Sakuyama et al. | |
| 6,226,011 B1 | 5/2001 | Sakuyama et al. | |
| 6,476,933 B1 * | 11/2002 | Honma | 358/1.9 |
| 6,546,130 B1 * | 4/2003 | Inoue et al. | 382/162 |
| 6,791,716 B1 * | 9/2004 | Buhr et al. | 358/1.9 |
| 6,796,629 B2 | 9/2004 | Komatsu et al. | |
| 6,839,460 B2 | 1/2005 | Shirasawa et al. | |

(Continued)

FOREIGN PATENT DOCUMENTS

JP    5-130425    5/1993

(Continued)

OTHER PUBLICATIONS

U.S. Appl. No. 08/052,918, filed Apr. 27, 1993, Shirasawa et al.

(Continued)

*Primary Examiner*—Mark K Zimmerman
*Assistant Examiner*—Dung D Tran
(74) *Attorney, Agent, or Firm*—Blakely, Sokoloff, Taylor & Zafman LLP

(57) ABSTRACT

An image processing apparatus that stores input image data is disclosed. The image processing apparatus includes a color space evaluating unit which evaluates a color space of the input image data by comparing the color space of the input image data with a reference color space, a frequency distribution calculating unit which calculates an appearing frequency distribution of a color included in the input image data, and a color space determining unit which determines a color space in which the input image data are to be stored by applying color control to the input image data based on the evaluated result by the color space evaluating unit and the calculated result by the frequency distribution calculating unit.

6 Claims, 4 Drawing Sheets

U.S. PATENT DOCUMENTS

| | | |
|---|---|---|
| 7,043,385 B2 * | 5/2006 | Stokes .................... 702/88 |
| 7,061,647 B2 * | 6/2006 | Matsuya .................. 358/1.9 |
| 7,068,284 B2 * | 6/2006 | Stokes .................... 345/604 |
| 7,079,284 B2 * | 7/2006 | Kawakami et al. ........ 358/1.9 |
| 2001/0019427 A1 | 9/2001 | Komatsu |
| 2002/0122193 A1 | 9/2002 | Shirasawa |
| 2004/0126009 A1 | 7/2004 | Takenaka |
| 2005/0008258 A1 | 1/2005 | Suzuki et al. |
| 2005/0089221 A1 | 4/2005 | Shirasawa |
| 2005/0140994 A1 * | 6/2005 | Hasegawa ................. 358/1.9 |
| 2005/0140997 A1 | 6/2005 | Shirasawa |
| 2005/0141848 A1 * | 6/2005 | Deguchi et al. ............. 386/1 |
| 2005/0237544 A1 | 10/2005 | Suzuki |
| 2005/0248801 A1 | 11/2005 | Miyahara |
| 2006/0120598 A1 * | 6/2006 | Takahashi et al. ......... 382/167 |

FOREIGN PATENT DOCUMENTS

| | | |
|---|---|---|
| JP | 2001-69362 | 3/2001 |
| JP | 2003-153014 | 5/2003 |
| JP | 2003-153297 | 5/2003 |
| JP | 2004-200902 | 7/2004 |

OTHER PUBLICATIONS

U.S. Appl. No. 08/359,146, filed Dec. 19, 1994, Komatsu.
U.S. Appl. No. 09/567,477, filed May 8, 2000, Ricoh.
U.S. Appl. No. 11/206,130, filed Aug. 18, 2005, Komatsu.

* cited by examiner

IMAGE PROCESSING APPARATUS AND METHOD THEREOF

PRIORITY

The present application claims priority to and incorporates by reference the entire contents of Japanese priority document 2005-198080, filed in Japan on Jul. 6, 2005.

BACKGROUND OF THE INVENTION

1. Field of the Invention

The present invention generally relates to an image processing apparatus and a method thereof in which color image data are input and the color image data are stored by applying color control to the input color image data.

2. Description of the Related Art

Various technologies have been proposed for an image processing apparatus which processes color image data input from a digital still camera, a digital video camera, a scanner, and so on.

In Japanese Laid-Open Patent Application No. 2004-200902, an image processing apparatus which uses one of the technologies is disclosed. In the image processing apparatus, a color gamut which is a distribution range of colors of input color image data is detected from the input color image data, a color space which substantially includes the color gamut is determined, and the input color image data are converted into image data which are expressed by the determined color space by using a color space converting unit. With this, colors of an object which is taken are precisely reproduced by the converted image data. The image processing apparatus can store the input color image data in a manner so that the degradation of the color image data is as small as possible.

In addition, in Japanese Laid-Open Patent Application No. 2003-153014, another image processing apparatus which uses one of the technologies is disclosed. In the image processing apparatus, color manuscript image data (in an RGB color space) read by an image reading unit are temporarily stored, and when the color manuscript image data are transmitted, the color manuscript image data are converted into image data corresponding to the image processing ability of a destination image communication apparatus. The conversion is RGB to L*a*b or RGB to L*a*b to sRGB. In the image processing apparatus, the image degradation caused by color space conversion operation errors can be as small as possible by executing the conversion corresponding to the ability of the destination once at the time of transmission of the image data without executing the conversion at the time of storing the image data. The image processing apparatus can make the degradation of the color image data low by decreasing the number of conversion times of the color space.

As described above, various image processing apparatuses and methods thereof have been proposed in which the input color image data are encoded by making the degradation of image data low and the input image data are satisfactorily reproduced.

In the image processing apparatus of Japanese Laid-Open Patent Application No. 2004-200902, input image data are divided into plural image regions, and hue and colorfulness (saturation) of each image region in which the image data is divided are calculated, and a color gamut is detected by obtaining the maximum colorfulness in each calculated hue. Further, a color space determining unit determines a color space that substantially includes the color gamut detected by a color gamut detecting unit, and a color space converting unit converts the input image data into image data of the determined color space.

However, in Japanese Laid-Open Patent Application No. 2004-200902, in order to detect the color gamut, an xy chromaticity coordinate is obtained from the input image data, and after representative hue and colorfulness are obtained in each of the plural image regions, the maximum colorfulness is obtained in each hue. That is, double or triple calculations are needed to obtain the maximum colorfulness.

Further, the color space that substantially includes the color gamut is determined by the maximum colorfulness in each hue; however, an area ratio of a region that belongs to each hue to the entire area of the input image is not considered. Therefore, even in a case where a large color difference exists such as having high colorfulness in a small area, a color space having a one rank larger color gamut is selected. Consequently, the quantization becomes rough and the difference between the input image data and the converted image data becomes large.

In addition, the background of the image is an important element that determines the appearance of the image. However, in Japanese Laid-Open Patent Application No. 2004-200902, since the area is not considered when the color space is determined, a color space which does not include hue belonging to a nearly uniform background may be selected depending on a predetermined ratio of the area. Consequently, the appearance of the image may be greatly changed.

SUMMARY OF THE INVENTION

An image processing apparatus and method thereof are described. In one embodiment, an image processing apparatus that stores input image data, comprises a color space evaluating unit which evaluates a color space of the input image data by comparing the color space of the input image data with a reference color space, a frequency distribution calculating unit which calculates an appearing frequency distribution of a color included in the input image data, and a color space determining unit which determines a color space in which the input image data are to be stored by applying color control to the input image data based on the evaluated result by the color space evaluating unit and the calculated result by the frequency distribution calculating unit.

DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Figure 1:
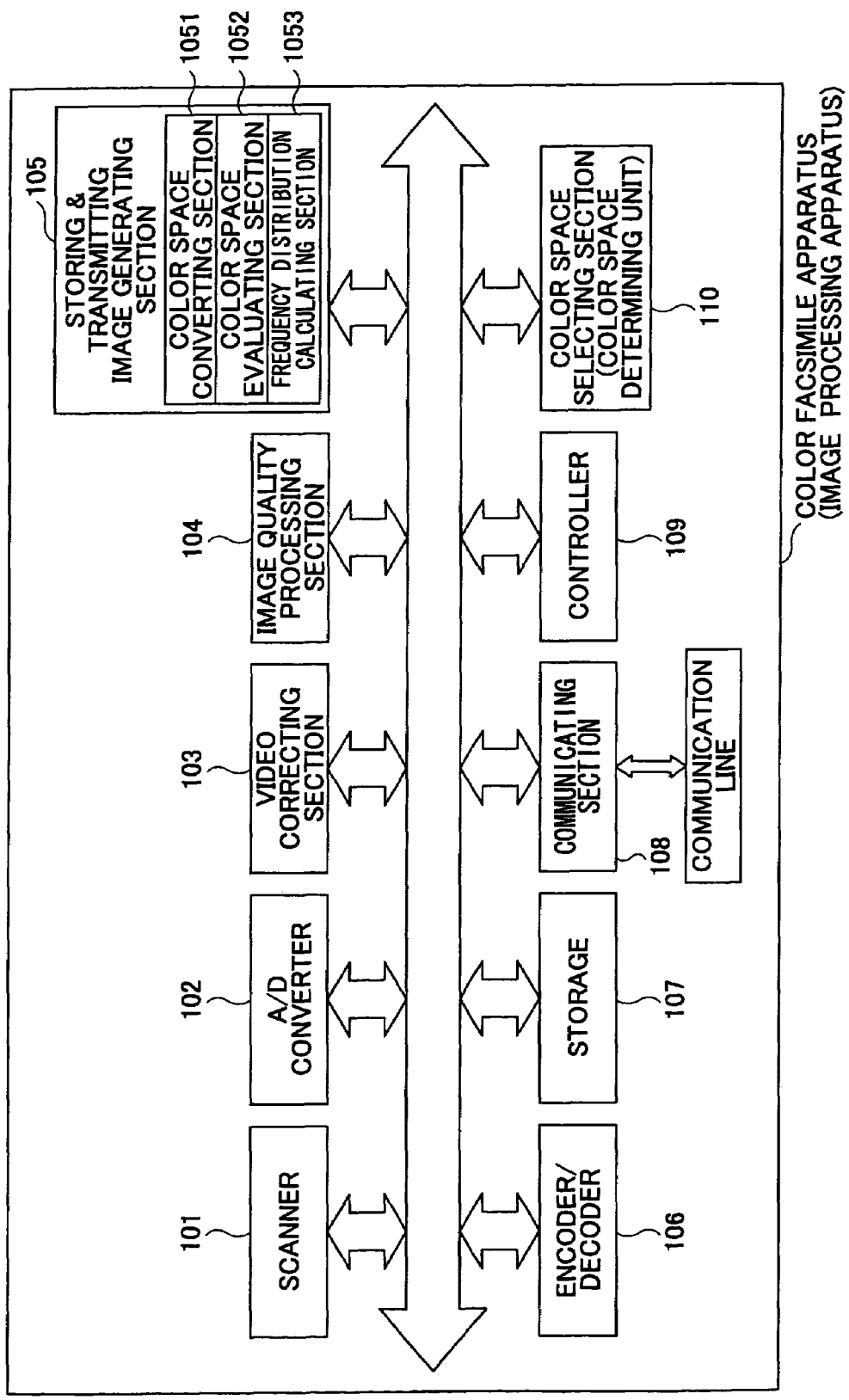
FIG. 1 is a block diagram showing an image processing apparatus according to a first embodiment of the present invention.

In one embodiment of the present invention, there is provided an image processing apparatus and a method thereof in which the degradation of color image data in a color gamut caused by compression of the color gamut due to clipping or gamut mapping can be restrained.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus and a method thereof particularly pointed out in the specification in such full, clear, concise, and exact terms as to enable a person having ordinary skill in the art to practice the invention.

To achieve these and other advantages in accordance with the purpose of the present invention, according to a first embodiment of the present invention, there is provided an image processing apparatus which stores input image data. The image processing apparatus includes a color space evaluating unit which evaluates a color space of the input image data by comparing the color space of the input image data with a reference color space, a frequency distribution calculating unit which calculates an appearing frequency distribution of a color included in the input image data, and a color space determining unit which determines a color space in which the input image data are to be stored by applying color control to the input image data based on the evaluated result by the color space evaluating unit and the calculated result by the frequency distribution calculating unit.

According to another embodiment of the present invention, as the reference color space, other than the CIELAB color space and the CIELUV color space in which the value of the brightness signal is allowed to take less than 0 and 100 or more, at least two or more of a relative sensing amount color space or an absolute sensing amount color space are used from the sRGB color space, the scRGB color space, the AdobeRGB color space, the ROMMRGB color space, the sYCC color space, the bg-sRGB color space, the bg-sYCC color space, the Wide Gamut RGB color space, the NTSC color space, and the CIECAM02 color space.

According to yet another embodiment of the present invention, the color space determining unit compresses the distribution range of the color included in the input image data as the color control by moving a white point in a direction in which the brightness becomes greater based on the evaluated result when the determined color space is a predetermined color space.

According to still yet another embodiment of the present invention, the color space determining unit compresses the distribution range of the color included in the input image data as the color control by controlling environment parameters based on the evaluated result when the determined color space is the absolute sensing amount color space.

According to one embodiment of the present invention, the color space determining unit does not compress the distribution range of the color included in the input image data and changes the reference color space when the input image data are stored in a storing unit in a case where a maximum value or an average value of the minimum color difference between each color of the input image data of the evaluated result and a color at a lattice point of the reference color space is a predetermined value or more.

According to one embodiment of the present invention, the evaluated result includes at least one of values of a color difference equivalent value from a color at a lattice point in the color space which is closest to a color outside the color space to be compared, and a maximum value or an average value of the minimum color difference between each color of the input image data and a color at the lattice point of the reference color space in a color included in the input image data.

According to one embodiment of the present invention, the frequency distribution is an appearing rate of a color included in the input image data in a color space to be compared or a sticking out rate of a color included in the input image data from a color space to be compared.

According to another embodiment of the present invention, there is provided an image processing method in an image processing apparatus. The image processing method includes evaluating a color space of the input image data by comparing the color space of the input image data with a reference color space, calculating an appearing frequency distribution of a color included in the input image data, and determining a color space in which the input image data are to be stored by applying color control to the input image data based on the evaluated result by the color space evaluating step and the calculated result by the frequency distribution calculating step.

According to another embodiment of the present invention, as the reference color space, other than the CIELAB color space and the CIELUV color space in which the value of the brightness signal is allowed to take less than 0 and 100 or more, at least two or more of a relative sensing amount color space or an absolute sensing amount color space are used from the sRGB color space, the scRGB color space, the AdobeRGB color space, the ROMMRGB color space, the sYCC color space, the bg-sRGB color space, the bg-sYCC color space, the Wide Gamut RGB color space, the NTSC color space, and the CIECAM02 color space.

According to still another embodiment of the present invention, the color space determining step compresses the distribution range of the color included in the input image data as the color control by moving a white point in a direction in which the brightness becomes greater based on the evaluated result when the determined color space is a predetermined color space.

According to one embodiment of the present invention, the color space determining step compresses the distribution range of the color included in the input image data as the color control by controlling environment parameters based on the evaluated result when the determined color space is the absolute sensing amount color space.

According to one embodiment of the present invention, the color space determining step does not compress the distribution range of the color included in the input image data and changes the reference color space when the input image data are stored in a storing unit in a case where a maximum value or an average value of the minimum color difference between each color of the input image data of the evaluated result and a color at a lattice point of the reference color space is a predetermined value or more.

According to another embodiment of the present invention, the evaluated result includes at least one of values of a color difference equivalent value from a color at a lattice point in the color space which is closest to a color outside the color space to be compared, and a maximum value or an average value of the minimum color difference between each color of the input image data and a color at the lattice point of the reference color space in a color included in the input image data.

According to an embodiment of the present invention, the frequency distribution is an appearing rate of a color included in the input image data in a color space to be compared or a sticking out rate of a color included in the input image data from a color space to be compared.

Effect of the Invention

According to embodiments of the present invention, when input image data are stored, the input image data can be efficiently stored by restraining degradation in a color gamut caused by clipping and so on.

Best Mode of Performing the Invention

A mode of performing the present invention is described with reference to the accompanying drawings.

First Embodiment

In a first embodiment of the present invention, an image processing apparatus is provided. In the image processing apparatus, input color image data are efficiently stored by restraining the degradation in a color gamut caused by clipping and so on.

In addition, in the first embodiment of the present invention, an image processing apparatus is provided. In the image processing apparatus, a color space that effectively uses a recording medium in a color gamut can be selected by efficiently comparing and evaluating color spaces.

In addition, in the first embodiment of the present invention, an image processing apparatus is provided. In the image processing apparatus, a color gamut can be compressed by a unique conversion method without using a complex color gamut compression algorithm but by controlling a white point.

In addition, in the first embodiment of the present invention, an image processing apparatus is provided. In the image processing apparatus, when input color image data are to be stored, the color gamut of the input color image data is compressed; however, the degradation of the input color image data caused by the compression can be restrained.

In addition, in the first embodiment of the present invention, an image processing apparatus is provided. In the image processing apparatus, when input color image data are to be stored, a suitable color space can be selected by utilizing a color difference equivalent value.

In addition, in the first embodiment of the present invention, an image processing apparatus is provided. In the image processing apparatus, when input color image data are to be stored, a suitable color space can be selected without calculating a color gamut.

First, a structure of the image processing apparatus according to the first embodiment of the present invention is described.

FIG. 1 is a block diagram showing an image processing apparatus according to the first embodiment of the present invention.

In FIG. 1, as the image processing apparatus, a color facsimile apparatus is used. As shown in FIG. 1, the color facsimile apparatus includes a scanner 101, an A/D converter 102, a video correcting section 103, an image quality processing section 104, a storing and transmitting image generating section 105, an encoder/decoder 106, storage 107, a communicating section 108, a controller 109, and a color space selecting section 110. The storing and transmitting image generating section 105 includes a color space converting section 1051, a color space evaluating section 1052, and a frequency distribution calculating section 1053.

In the first embodiment, the color facsimile apparatus provides a network scanner function and can connect to a telephone line and a LAN (local area network).

Figure 2:
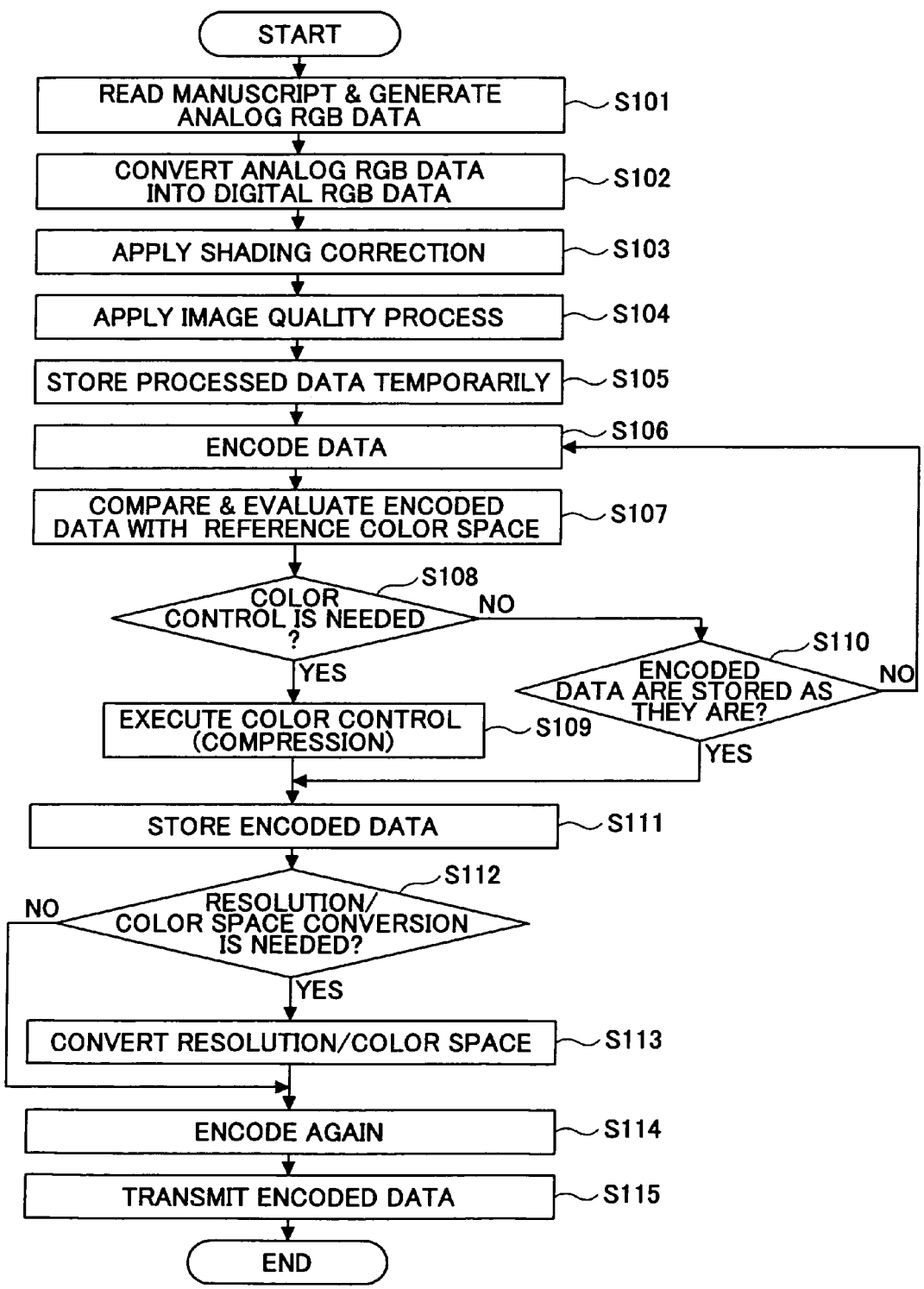
FIG. 2 is a flowchart showing operations of the image processing apparatus shown in FIG. 1.

Next, referring to FIGS. 1 and 2, operations of the color facsimile apparatus according to the first embodiment of the present invention are described.

FIG. 2 is a flowchart showing the operations of the color facsimile apparatus shown in FIG. 1.

First, a manuscript is read by the scanner 101, and analog RGB data are generated (step S101). The analog RGB data are converted into digital RGB data at the A/D converter 102 by being quantized (step S102). A shading correction is applied to the digital RGB data at the video correcting section 103 and a white wave shaped distortion formed at the scanner 101 is corrected (step S103). Processes of image quality such as contour exaggeration are applied to the corrected data by a filter operation at the image quality processing section 104 (step S104) and the processed data are temporarily stored in the storage 107 (step S105).

Next, the digital RGB data (RGB multi-level image data) are encoded into, for example, JPEG image data at the encoder/decoder 106 (step S106). In order to store the encoded data, the color space of the encoded data is compared and evaluated with a reference color space (step S107). In the comparison and the evaluation, first, the data encoded at the encoder/decoder 106 (device dependent data) are converted into data on a color space of device independent data at the color space converting section 1051. In the conversion, for example, by using a device proper profile, the encoded data can be converted from device dependent RGB data→device independent CIELAB data→sRGB data. Or by preparing profiles of color spaces such as the sRBG color space, the AdobeRGB color space (a registered trademark), and the ROMMRGB color space, the device dependent RGB data can be directly converted into device independent data. At the conversion, for example, since the RGB color space takes a value of RGB channel 0 to 255 (in 8 bits), in order to express the encoded data as data of the sRGB color space, when a value which is less than 0 or more than 255 appears, clipping is required. In this case, since the color space of the input image data (encoded data) is compared with each reference color space, clipping is not executed and a value of less than 0 or more than 255 is allowed.

Further, at the color space evaluating section 1052, it is evaluated whether each pixel of the encoded data is inside the sRGB color space. At the same time, at the frequency distribution calculating section 1053, a frequency distribution of the number of pixels inside the sRGB color space or of the number of pixels outside the sRGB color space is calculated. Specifically, in the sRGB values of the input image data (encoded data), even when one channel is less than 0 or more than 255, the pixel value is outside the sRGB color space.

For the pixels outside the sRGB color space, a value equivalent to a color difference from the closest lattice point in the sRGB color space is calculated; the value is, for example, a Euclidean distance. For example, when a pixel of the input image data is a sRGB value of (RGB)=(124, 210, 265), the distance from (124, 210, 255), that is, 10 is calculated as a value equivalent to the color difference (step S107). As an example, the ratio of the number of pixels outside the sRGB color space to the number of all pixels, that is, the ratio of the area outside the sRGB color space to all the area in the input image data, and a value equivalent to a color difference (hereinafter referred to as a color difference equivalent value) of the pixels are determined as evaluation indexes. However, indexes other than the above indexes can be used. The storing and transmitting image generating section 105 sends the above result to the color space selecting section 110 (color space determining unit).

The color space selecting section 110 receives the compared and evaluated result, and determines whether color control (compression) is needed for the input image data (encoded data) (step S108). When the color control is needed (YES at step S108), color control such as compression of the input image data (encoded data) is executed (step S109). When the color control is not needed (NO at step S108), it is determined whether the input image data (encoded data) temporarily stored in the storage 107 are to be stored as they are (step S110). When it is determined that the input image data are to be stored as they are in the storage 107 (YES at step S110), the input image data are stored (retained) in the storage 107 (step S111). After step S109, the encoded data on which the color control is executed are stored in the storage 107 (step S111).

Operations in steps S108 through S111 are described in more detail. When all the colors that are included in the input image data are inside the sRGB color space, it is determined that the color control is not needed (No at step S108), and it is determined that the input image data (encoded data) are to be stored as they are (YES at step S110). Then the encoded data are stored (retained) in the storage 107 (step S111).

In addition, there is a case where a color that is included in the input image data is outside the sRGB color space. For example, there is a case in which a part of the input image data that is outside the sRGB color space is less than 1% of all the input image data (hereinafter referred to as an outside ratio), and the color difference equivalent value is, for example, as small as approximately 5. In this case, when the input image data are stored by using one rank larger color space (for example, the AdobeRGB color space) due to the small outside ratio, the quantization may become rough and a pseudo contour may appears. In order to solve this problem, since the white point in the sRGB color space is normally (255, 255, 255), a virtual white point is set as a value (270, 270, 270), and all the pixel values are multiplied by 255/270. With this, the distribution range of a color of the input image data is compressed and a color is restrained from being outside the sRGB color space; when the value of the virtual white point is not set as an extremely large value (in this case, the virtual white point is set as 270), tone blurring caused by the compression at the shadow side can be restrained. When any pixel that is outside the sRGB color space exists, clipping is applied to the pixel, all the remaining pixels are set inside the sRGB color space, and the encoded data are stored in the storage 107 with the white point information and the color space information.

In addition, there is a case where the outside ratio is very small and the maximum or average color difference equivalent value is extremely large. In this case, when a color is attempted to be placed inside the sRGB color space by compression, the value of the virtual white point becomes very large, for example, 350; therefore, tone blurring at the shadow side become noticeable. In this case, it is determined that the color control is not needed (NO at step S108) and it is also determined that the encoded data are not to be stored as they are (NO at S110). Then, the reference color space in the comparison and the evaluation is changed to one rank larger color space (for example, the AdobeRGB color space) and the input image data are converted into the AdobeRGB color space and compared and evaluated with the AdobeRGB color space (step S107).

Next, there is a case where the outside ratio is very large and the color difference equivalent value is small. In this case, the distribution range of the color of the input image data is compressed by converting the virtual white point and the encoded data are stored. In addition, when the outside ratio is a very large one and the color difference equivalent value is extremely large, the color space is changed to one rank larger and the comparison and the evaluation are executed.

In the above, four cases are described in which the outside ratio of a part of the input image data to the input image data from the reference color space is different and the color difference equivalent value of the pixel value outside the reference color space is different. However, the cases are not limited to the above. For example, in a case where the tone blurring at the shadow side is noticeable, the tolerance of the color difference equivalent value is set as a small value and weighting at the determination is set as a large value so that compression by moving the virtual white point is not executed. The above case is also possible.

When the color image data are transmitted, the communicating section 108 establishes a connection with a destination image communication apparatus, and obtains information about any type of color spaces of color image data that can be processed in the destination image communication apparatus.

When the color image data are transmitted, the encoder/decoder 106 decodes the encoded color image data stored in the storage 107. When the destination image communication apparatus can only process color image data of the CIELAB color space, the controller 109 determines that the color space conversion is needed when the encoded color image data are stored, for example, in the sRGB color space and the movement of the virtual white point is executed (YES at step S112). The color space selecting section 110 executes an expansion process to return the virtual white point to the original point, and the color space converting section 1051 converts the sRGB color space into the CIELAB color space (step S113). In addition, the controller 109 determines whether the resolution conversion is needed based on the resolution of the destination image communication apparatus (step S112). When the controller 109 determines that the resolution conversion is not needed (NO at step S112), the decoded data stored in the storage 107 are encoded again (step S114), and the encoded data are transmitted to the destination image communication apparatus from the communicating section 108 (step S115). When the controller 109 determines that the resolution conversion is needed (YES at step S112), the conversion of the resolution is executed (step S113), the decoded data stored in the storage 107 are encoded again (step S114), and the encoded data are transmitted to the destination image communication apparatus from the communicating section 108 (step S115).

As described above, according to one embodiment of the present invention, in an image processing apparatus in which color manuscript image data read by an image reading unit or color image data input from an image input unit are to be stored in an image storing unit, the following operations can be executed. That is, it is determined whether a color included in the color manuscript image data or in the input color image data is included in a reference color space by comparing and evaluating the color with color spaces such as a device dependent color space, an input data color space, and reference color spaces. At the same time, a frequency distribution in which the number of pixels of the color is included in the reference color space is detected, color control is applied to the input image data based on the comparison and evaluation result and the frequency distribution, and a color space in which the input image data are to be stored is determined. With this, the degradation in the color gamut caused by clipping at the time of storage is restrained and the input image data can be efficiently stored.

In addition, according to one embodiment of the present invention, as the reference color spaces at the time of evaluating the distribution range of colors included in input image data and storing the input image data, other than the CIELAB color space and the CIELUV color space, at least two of the following color spaces are used. That is, as the color spaces, there are sensing amount color spaces (a relative sensing amount color space JCh or an absolute sensing amount color space QMh) such as the sRGB color space, the scRGB color space, the AdobeRGB color space, the ROMMRGB color space, the sYCC color space, the bg-sRGB color space, the bg-sYCC color space, the Wide Gamut RGB color space, the NTSC color space, and the CIECAM02 color space. With this, the input image data can be stored by comparing and evaluating colors in the color spaces that effectively include the color gamut. Further, quantization errors caused by using excessively large color spaces for storing the input image data can be restrained.

In addition, according to one embodiment of the present invention, a white point of the input image is virtually moved in a higher brightness direction corresponding to the comparison result of the distribution range of colors included in the input image data, and the distribution range of the colors is compressed. Therefore, the distribution range of the colors can be compressed by a unique conversion method without using a complex color gamut compression algorithm.

In addition, according to one embodiment of the present invention, when the color difference equivalent value between the input image data and the color space for storing in which mapping is applied to the input image data is a predetermined value or more, the color space for storing is changed to one rank larger color space. Therefore, tone blurring caused by excessive compression of the distribution range of the colors of the input color image can be prevented, and at the same time, the degradation caused by the mapping can be prevented.

In addition, according to one embodiment of the present invention, as the evaluation indexes of the distribution range of the colors of the input image data, in colors included in the input image data, at least one of the following values is included. That is, the values are a color difference equivalent value from a color at a lattice point in the color space that is closest to a color outside the color space to be compared, and a maximum value or an average value of the minimum color difference between each color of the input image data and a color at the lattice point of a reference color space. Therefore, a suitable color space for storing can be selected in each of the input image data.

In addition, according to one embodiment of the present invention, the ratio of a color included in the input image data to colors which are included in a color space to be compared or the ratio of a color included in the input image data to colors that are outside the color space to be compared is considered. Therefore, a suitable color space for storing can be selected by considering an area which pixels outside the reference color space occupy in the input image without calculating the color gamut of the input image.

Second Embodiment

In a second embodiment of the present invention, an image processing apparatus is provided. In the image processing apparatus, input color image data are efficiently stored by restraining the degradation in a color gamut caused by clipping and so on.

In addition, in the second embodiment of the present invention, an image processing apparatus is provided. In the image processing apparatus, a color space that effectively uses a recording medium in a color gamut can be selected by efficiently comparing and evaluating color spaces.

In addition, in the second embodiment of the present invention, an image processing apparatus is provided. In the image processing apparatus, a color gamut can be compressed by a unique conversion method without using a complex color gamut compression algorithm but by controlling a white point.

In addition, in the second embodiment of the present invention, an image processing apparatus is provided. In the image processing apparatus, when input color image data are stored, the color gamut of the input color image data is compressed; however, the degradation of the input color image data caused by the compression can be retrained.

In addition, in the second embodiment of the present invention, an image processing apparatus is provided. In the image processing apparatus, when input color image data are stored, a suitable color space can be selected by utilizing a color difference equivalent value.

In addition, in the second embodiment of the present invention, an image processing apparatus is provided. In the image processing apparatus, when input color image data are stored, a suitable color space can be selected without calculating a color gamut.

Figure 3:
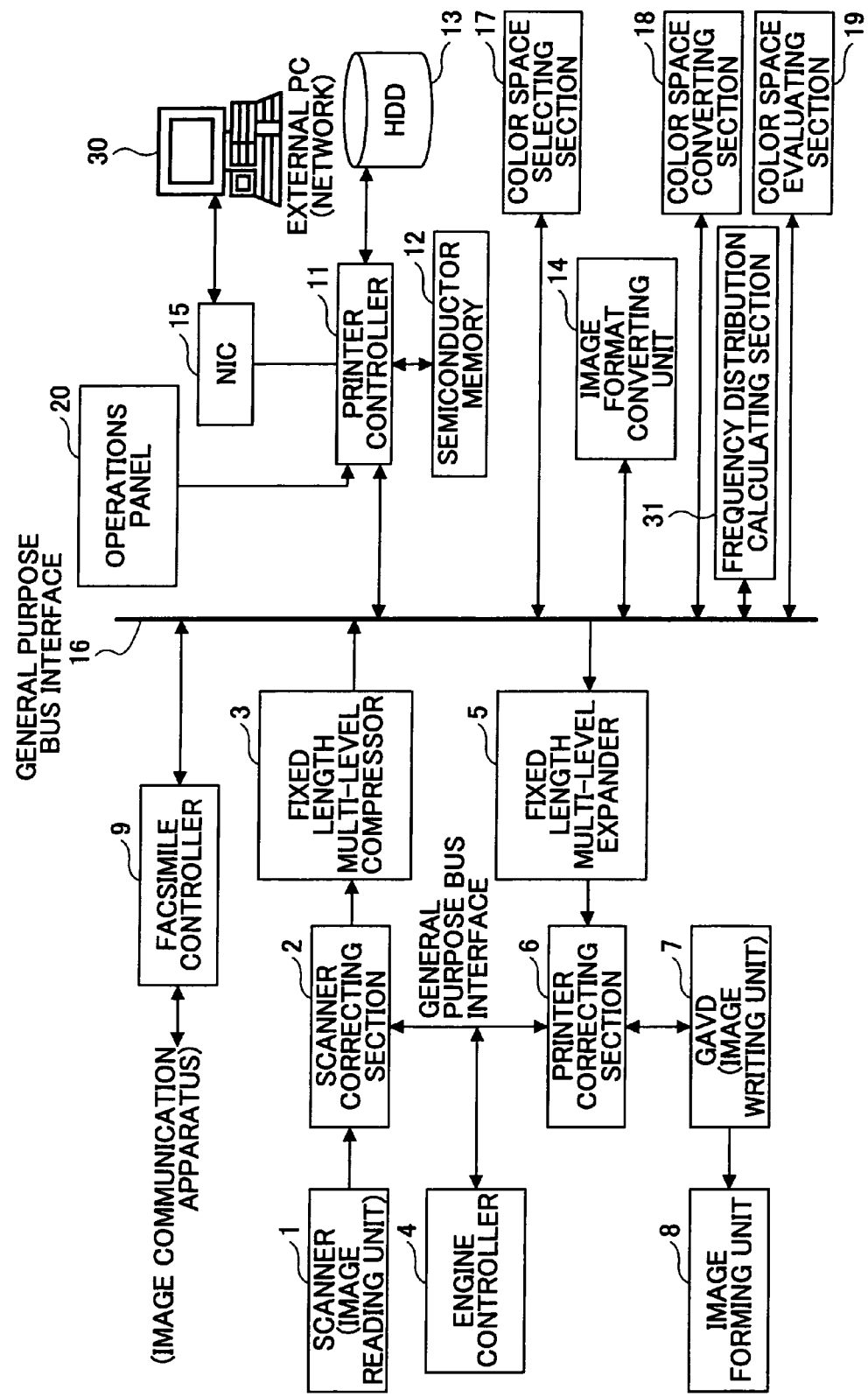
FIG. 3 is a block diagram showing an image processing apparatus according to a second embodiment of the present invention.

FIG. 3 is a block diagram showing an image processing apparatus according to the second embodiment of the present invention.

In FIG. 3, as the image processing apparatus, a full color multifunctional apparatus called a multifunctional peripheral is used. As shown in FIG. 1, the full color multifunctional apparatus includes a plotter engine (hereinafter referred to as an engine), a printer controlling section, and an operations panel 20.

The engine includes a scanner (image reading unit) 1, a scanner correcting unit 2, a fixed length multi-level compressor 3, an engine controller 4, a fixed length multi-level expander 5, a printer correcting section 6, a GAVD (image writing unit) 7, an image forming unit 8, and a facsimile controller 9.

The printer controlling section includes a printer controller 11, storage such as a semiconductor memory 12 and a HDD (hard disk drive) 13, an image format converting unit 14, a NIC (network interface card) 15, a color space selecting section 17, a color space converting section 18, a color space evaluating section 19, and a frequency distribution calculating section 31. In this, in the full color multifunctional apparatus, an image printing unit which includes the GAVD 7, the image forming unit 8, and the fixed length multi-level expander 5 can be excluded from the engine.

The engine and the printer controlling section are connected by a general purpose bus interface 16.

The scanner 1 in the engine is an image inputting unit (image reading unit) and optically reads an image of a paper put on an image reading position (for example, on a contact glass) or an image of a paper while the paper is being passed through the image reading position. At this time, the scanner 1 applies photoelectric conversion to separated light of R (red), G (green), and B (blue) and amplifies the separated light, then sends the amplified light to the scanner correcting section 2 as 8-bit RGB image data which are electric image signals. In this, the image data are not limited to the 8-bit data.

The paper (draft) which is read is put on the image reading position of the scanner 1 by a user, each piece of the draft on a draft tray (not shown) is put on the image reading position of the scanner 1 by being automatically fed by an ADF (automatic draft feeder; not shown), or the draft is passed through the image reading position by the ADF.

The scanner correcting section 2.includes a scanner gamma correcting section (not shown), a filter processing section (not shown), a variable scaling processing section (not shown), a color determining section (not shown), and so on. The scanner correcting section 2 applies processes by the above sections to image data sent from the scanner 1. The scanner gamma correcting section applies a scanner γ correcting process to the image data, the filter processing section applies a filter process to the image data applied the scanner γ correcting process, and the variable scaling processing section applies a scaling process to the image data applied the filter process. The scanner correcting section 2 sends the image data processed by the above sections to the fixed length multi-level compressor 3. The fixed length multi-level compressor 3 is a fixed length non-reciprocal compressor. Parallel to the above processes, the color determining section determines whether the image data (draft) input from the scanner 1 are full color data (draft) or monochrome data (draft) and sends the color determined result to the engine controller 4. The color determined result can be utilized by a CPU (not shown) of the engine controller 4, if necessary, or can be attached to the image data which are sent to the fixed length multi-level compressor 3 and the information sent from the fixed length multi-level compressor 3 can be utilized by the color space selecting section 17.

The fixed length multi-level compressor 3 is a compressing unit and non-reciprocally compresses (encodes) the image data (device dependent data) sent from the scanner correcting section 2. Since the fixed length multi-level compressor 3 is connected to the general purpose bus interface 16, the image data to which the non-reciprocal compression is applied are sent to the color space evaluating section 19 in the printer controlling section via the general purpose bus interface 16.

When the image data are sent to the color space evaluating section 19, the color space converting section 18 converts the image data into device dependent RGB values by using a profile which connects representative lattice points of, for example, the sRGB color space (for example, (RGB)=(0,0,0) (0,0,64) (0,0,128) (0,0,192) (0,0,255) (0,64,0) . . . (255,255, 255)) to a device dependent RGB value and a device independent color notation value. Further, the color space converting section 18 calculates a cover range (for example, R=10 to 255, G=30 to 230, and B=0 to 255) of the sRGB color space in the device dependent RGB color space, and sends the calculated result to the color space evaluating section 19. In this, a cover range of each reference color space is calculated beforehand by converting a representative lattice point of each reference color space into a device dependent RGB value, the calculated result is stored in the storage such as the HDD 13 beforehand, and the stored result is sent to the color space evaluating section 19 by an instruction from the color space converting section 18. In this case, time to perform the conversion of the color space is not required. Similar to the first embodiment, the color space evaluating section 19 compares and evaluates whether the image data fit into the sRGB color space by using the above information.

The image data to which color control is applied, that is, the results of the evaluation, are stored in the semiconductor memory 12 and the HDD 13 by being sent via the general purpose bus interface 16 and the printer controller 11. At this time, when an instruction of a user from the operations panel 20, or an external PC 30 (or a network) does not exist, the image data are stored as device dependent data with information showing the device dependent data and moving information of a white point.

The printer controller 11 uses a micro computer including a CPU (central processing unit), a ROM (read only memory), and a RAM (random access memory) to control all the elements in the printer controlling section.

The semiconductor memory 12 can independently store each color of CMYK or RGB, and stores the image data by the control of the printer controller 11. The HDD 13 is a large capacity storage device and stores various data such as a large amount of the image data and job history data. Instead of using the HDD 13, a large capacity storage device such as an optical disk and a magnetic optical disk can be used.

The image data stored in the semiconductor memory 12 are also arbitrarily stored in the HDD 13 so that if paper jamming occurs at printing an image or printing is not finished normally, reading the paper again is avoided, or in order to execute electronic sorting which sorts the image data of plural drafts. Recently, there has been produced a full color multi-functional apparatus which has a function of storing the image data of a read draft in order to output the image data again (print again the image data or transmit again the image data via a network) when it is required.

In addition, in the above description, the image data are non-reciprocally compressed; however, when the band of the general purpose bus interface 16 is sufficiently wide and the storing capacity of the semiconductor memory 12 and the HDD 13 is sufficiently large, the image data are not needed to be compressed. In this case, the degradation of image quality caused by the non-reciprocal compression can be prevented.

When the image data are copied, the image data stored in the HDD 13 are temporarily stored in the semiconductor memory 12 by the printer controller 11 and the stored image data are sent to the color space selecting section 17 via the general purpose bus interface 16; an expanding process which returns the white point to the original point is executed, if necessary, and after this, the image data are sent to the color space converting section 18 and the color space of the image data is converted into a color space which can be processed by the engine. When the image data are stored in the HDD 13 by a color space, for example, the CIELAB color space in which the engine can process the image data as they are, the image data are stored in the semiconductor memory 12 by the printer driver 11 and sent to the engine via the general purpose bus interface 16.

The image data for copying sent from the printer controller 11 are sent to the fixed length multi-level expander 5 in the engine via the general purpose bus interface 16. The fixed length multi-level expander 5 is a fixed length non-reciprocal expander.

The fixed length multi-level expander 5 is an expanding unit and expands (decodes) the image data sent from the printer controlling section, if necessary, and sends the expanded image data to the printer correcting section 6. In this, when the image data are not sent via the color space converting section 18 such as CIELAB data, the expansion is needed. The printer correcting section 6 includes a color correcting section (not shown), a printer γ processing section (not shown), and a halftone processing section (not shown).

The printer correcting section 6 applies a color correction to the image data sent from the fixed length multi-level expander 5, obtains CMYK data, and applies a printer γ process to the CMYK data. Further, the halftone processing section sequentially applies a halftone process which matches the GAVD 7 and the image forming unit 8 to the printer γ processed data and sends each color of the halftone processed data to the GAVD 7.

The GAVD 7 (image writing unit) makes a semiconductor laser (not shown) emit a laser beam by applying a modulation drive to the semiconductor laser based on cyan (C) image data sent from the printer correcting section 6. The laser beam is periodically deflected by a polygon mirror (not shown) and a convergent laser beam is obtained by a scanning lens (not shown). Further, an electrostatic latent image is formed on a drum-shaped or belt-shaped photoconductor body (not shown) which is rotated in the sub scanning direction by repeatedly scanning the convergent laser beam in the main scanning direction. Similar to the above process, electrostatic latent images are sequentially formed based on magenta (M) image data, yellow (Y) image data, and black (K) image data sent from the printer correcting section 6.

The image forming unit 8 executes an existing image forming process. For example, the surface of the photoconductor body is uniformly charged by a charger (not shown), and a C toner image is formed on the photoconductor body by adhering C toner to the electrostatic latent image of the C image data formed on the photoconductor body at a C developing unit. The C toner image is transferred to a drum-shaped or belt-shaped intermediate transfer body by a first transfer unit. Next, an M toner image is formed on the photoconductor body by adhering M toner to the electrostatic latent image of the M image data formed on the photoconductor body at an M developing unit. The M toner image is transferred onto the C toner image of the intermediate transfer body by the first transfer unit. Similarly, a Y toner image and a K toner image are sequentially formed by a similar process by a Y developing unit and a K developing unit. With this, a four-color toner image in which four color toners are superposed is formed on the intermediate transfer body. The four-color toner image is transferred on a paper fed from a paper feeding tray (not shown) by a second transfer unit (not shown), and the four-color toner image on the paper is fixed (fused) by a fixing unit (not shown). The paper to which the above fixing process is applied is output to a paper outputting tray (not shown). In this, the processing order is not limited to the order of CMYK.

As described above, according to one embodiment of the present invention, in an image processing apparatus in which color paper image data read by an image reading unit or color image data input from an image input unit are stored in an image storing unit, the following operations can be executed. That is, it is determined whether a color included in the color manuscript image data or in the input color image data is included in a reference color space by comparing and evaluating the color with color spaces such as a device dependent color space, an input data color space, and reference color spaces. At the same time, a frequency distribution in which the number of pixels of the color is included in the reference color space is detected, color control is applied to the input image data based on the comparison and evaluation result and the frequency distribution, and a color space in which the input image data are to be stored is determined. With this, the degradation in the color gamut caused by clipping at the time of storage is restrained and the input image data can be efficiently stored.

In addition, according to one embodiment of the present invention, as the reference color spaces at the time of evaluating the distribution range of a color included in input image data and storing the input image data, other than the CIELAB color space and the CIELUV color space, at least two of the following color spaces are used. That is, as the color spaces, there are sensing amount color spaces (a relative sensing amount color space JCh or an absolute sensing amount color space QMh) such as the sRGB color space, the scRGB color space, the AdobeRGB color space, the ROMMRGB color space, the sYCC color space, the bg-sRGB color space, the bg-sYCC color space, the Wide Gamut RGB color space, the NTSC color space, and the CIECAM02 color space. With this, the input image data can be stored by comparing and evaluating colors in the color spaces which effectively use the color gamut. Further, quantization errors caused by using excessively large color spaces for storing the input image data can be restrained.

In addition, according to one embodiment of the present invention, a white point of the input image is virtually moved in a higher brightness direction corresponding to the comparison result of the distribution range of colors included in the input image data, and the distribution range of the colors is compressed. Therefore, the distribution range of the colors can be compressed by a unique conversion method without using a complex color gamut compression algorithm.

In addition, according to one embodiment of the present invention, when the color difference equivalent value between the input image data and the color space for storing in which mapping is applied to the input image data is a predetermined value or more, the color space for storing is changed to one rank larger color space. Therefore, tone blurring caused by excessive compression of the distribution range of the colors of the input color image can be prevented, and at the same time, degradation caused by the mapping can be prevented.

In addition, according to one embodiment of the present invention, as the evaluation indexes of the distribution range of the colors of the input image data, in colors included in the input image data, at least one of the following values is included. That is, the values are a color difference equivalent value from a color at a lattice point in the color space which is closest to a color outside the color space to be compared, and a maximum value or an average value of the minimum color difference between each color of the input image data and a color at the lattice point of a reference color space. Therefore, a suitable color space for storing can be selected in each set of the input image data.

In addition, according to one embodiment of the present invention, the ratio of a color included in the input image data to colors which are included in a color space to be compared or the ratio of a color included in the input image data to colors which are outside the color space to be compared is considered. Therefore, a suitable color space for storing can be selected by considering an area which pixels outside the reference color space occupy in the input image without calculating the color gamut of the input image.

Third Embodiment

In a third embodiment of the present invention, an image processing apparatus is provided. In the image processing apparatus, input color image data are efficiently stored by restraining the degradation in a color gamut caused by clipping and so on.

In addition, in the third embodiment of the present invention, an image processing apparatus is provided. In the image processing apparatus, a color space which effectively uses a recording medium in a color gamut can be selected by efficiently comparing and evaluating color spaces.

In addition, in the third embodiment of the present invention, an image processing apparatus is provided. In the image processing apparatus, a color gamut can be compressed by a unique conversion method without using a complex color gamut compression algorithm but by controlling a white point.

In addition, in the third embodiment of the present invention, an image processing apparatus is provided. In the image processing apparatus, when input color image data are stored, the color gamut of the input color image data is compressed; however, the degradation of the input color image data caused by the compression can be restrained.

In addition, in the third embodiment of the present invention, an image processing apparatus is provided. In the image processing apparatus, when input color image data are stored, a suitable color space can be selected by utilizing a color difference equivalent value.

In addition, in the third embodiment of the present invention, an image processing apparatus is provided. In the image processing apparatus, when input color image data are stored, a suitable color space can be selected without calculating a color gamut.

Again referring to FIG. 3, operations in the third embodiment of the present invention are described.

In the second embodiment, input image data are read by the scanner 1; however, in the third embodiment, image data belonging to a reference color space are input from the external PC 30 (or a network). In the third embodiment, operations of a case are described in which case image data of a Wide Gamut RGB color space are input by having attached viewing condition parameters (environment parameters) of the CIECAM02 from the external PC 30 (or a network) via the NIC 15.

The operations in the third embodiment of the present invention are described. When image data are input from the external PC 30 via the NIC 15, the printer controller 11 stores the input image data in the semiconductor memory 12 and the HDD 13, and at the same time, sends the input image data to the color space converting section 18 via the general purpose bus interface 16. Upon reception of the input image data, the color space converting section 18 converts the Wide Gamut color space into the AdobeRGB color space whose size is one rank smaller than that of the Wide Gamut color space. At this time, a value which is not in the range of 0 to 255 (in the case of 8 bits) is generally clipped; however, in this case, a value which is less than 0 or more than 255 is allowed. The color space converting section 18 sends the converted data to the color space evaluating section 19. The color space evaluating section 19 evaluates whether the converted data fit in the AdobeRGB color space.

When the input image data completely fit in the AdobeRGB color space, the input image data are sent to the printer controller 11 as they are, as the image data of the AdobeRGB color space. Or when the input image data are fitted in the AdobeRGB color space by compression of a relatively small movement of a white point, the input image data are sent to the printer controller 11 as the image data of the AdobeRGB color space by applying a compression process similar to that in the first embodiment. The sent image data are overwritten on the image data to which the color space conversion has not been applied in the semiconductor memory 12 and the HDD 13. When one rank larger color space is needed, the image data under evaluation are discarded, and the image data stored in the semiconductor memory 12 and the HDD 13 are used as they are. As described above, the image data which inefficiently use only a part of the Wide Gamut RGB color space can be stored in a color space (AdobeRGB color space) in which quantization errors are smaller. At the time of printing the image data, the operations are the same as those in the second embodiment.

As described above, according to one embodiment of the present invention, in an image processing apparatus in which color manuscript image data read by an image reading unit or color image data input from an image input unit are stored in an image storing unit, the following operations can be executed. That is, it is determined whether a color included in the color manuscript image data or in the input color image data is included in a reference color space by comparing and evaluating the color with color spaces such as a device dependent color space, an input data color space, and reference color spaces. At the same time, a frequency distribution in which the number of pixels of the color is included in the reference color space is detected, color control is applied to the input image data based on the comparison and evaluation result and the frequency distribution, and a color space in which the input image data are to be stored is determined. With this, the degradation in the color gamut caused by clipping at the time of storage is restrained and the input image data can be efficiently In addition, according to one embodiment of the present invention, as the reference color spaces at the time of evaluating the distribution range of a color included in input image data and storing the input image data, other than the CIELAB color space and the CIELUV color space, at least two of the following color spaces are used. That is, as the color spaces, there are sensing amount color spaces (a relative sensing amount color space JCh or an absolute sensing amount color space QMh) such as the sRGB color space, the scRGB color space, the AdobeRGB color space, the ROMMRGB color space, the sYCC color space, the bg-sRGB color space, the bg-sYCC color space, the Wide Gamut RGB color space, the NTSC color space, and the CIECAM02 color space. With this, the input image data can be stored by comparing and evaluating colors in the color spaces which effectively use the color gamut. Further, quantization errors caused by using excessively large color spaces for storing the input image data can be restrained.

In addition, according to one embodiment of the present invention, a white point of the input image is virtually moved in a higher brightness direction corresponding to the comparison result of the distribution range of colors included in the input image data, and the distribution range of the colors is compressed. Therefore, the distribution range of the colors can be compressed by a unique conversion method without using a complex color gamut compression algorithm.

In addition, according to one embodiment of the present invention, when the color difference equivalent value between the input image data and the color space for storing in which mapping is applied to the input image data is a predetermined value or more, the color space for storing is changed to one rank larger color space. Therefore, tone blurring caused by excessive compression of the distribution range of the colors of the input color image can be prevented, and at the same time, the degradation caused by the mapping can be prevented.

In addition, according to one embodiment of the present invention, as the evaluation indexes of the distribution range of the colors of the input image data, in colors included in the input image data, at least one of the following values is included. That is, the values are a color difference equivalent value from a color at a lattice point in the color space which is closest to a color outside the color space to be compared, and a maximum value or an average value of the minimum color difference between each color of the input image data and a color at the lattice point of a reference color space. Therefore, a suitable color space for storing can be selected in each set of the input image data.

In addition, according to one embodiment of the present invention, the ratio of a color including in the input image data to colors that are included in a color space to be compared or the ratio of a color including in the input image data to colors that are outside the color space to be compared is considered. Therefore, a suitable color space for storing can be selected by considering an area that pixels outside the reference color space occupy in the input image without calculating the color gamut of the input image.

Fourth Embodiment

In a fourth embodiment of the present invention, an image processing apparatus is provided. In the image processing apparatus, input color image data are efficiently stored by restraining the degradation in a color gamut caused by clipping and so on.

In addition, in the fourth embodiment of the present invention, an image processing apparatus is provided. In the image processing apparatus, a color space which effectively uses a recording medium in a color gamut can be selected by efficiently comparing and evaluating color spaces.

In addition, in the fourth embodiment of the present invention, an image processing apparatus is provided. In the image processing apparatus, a color gamut can be compressed by a unique conversion method without using a complex color gamut compression algorithm but by controlling environment parameters.

In addition, in the fourth embodiment of the present invention, an image processing apparatus is provided. In the image processing apparatus, when input color image data are stored, the color gamut of the input color image data is compressed; however, the degradation of the input color image data caused by the compression can be restrained.

In addition, in the fourth embodiment of the present invention, an image processing apparatus is provided. In the image processing apparatus, when input color image data are to be stored, a suitable color space can be selected by utilizing a color difference equivalent value.

In addition, in the fourth embodiment of the present invention, an image processing apparatus is provided. In the image processing apparatus, when input color image data are to be stored, a suitable color space can be selected without calculating a color gamut.

Again referring to FIG. 3, operations in the fourth embodiment of the present invention are described.

In the fourth embodiment, the compression of the distribution range of a color including in input image data is executed by a QMh color space which is an absolute sensing amount color space in the CIECAM02 color appearance model. The CIECAM02 color appearance model is an existing technology in which a color sensing amount (color appearance amount) is predicted by an XYZ tristimulus value of an object (measurement color value), an XYZ tristimulus value XwYwZw of a reference white, and environment parameters (including viewing condition parameters) such as brightness Yb of a background, brightness La of an adaptation visual field, and an adaptation rate D. In the fourth embodiment, operations are described in a case where AdobeRGB image data are input so that environment parameters are attached to the AdobeRGB image data from the network 30 (external PC).

When image data are input together with environment parameters, the printer controller 11 stores the input image data in the semiconductor memory 12 and the HDD 13, and further, sends the input color image data to the color space converting section 18.

The color space converting section 18 converts the input image data into an absolute sensing amount color space QMh in the CIECAM02 by using the attached environment parameters. The QMh comes from Q (brightness), M (colorfulness), and h (hue). The "h" is a value of 0 to 360 degrees in the CIECAM02; however, in the image processing apparatus of the present embodiment, since each channel is 8 bits, the value of "h" can be 0 to 255. Therefore, when the color conversion is executed, a value in which the value in the CIECAM is multiplied by 360/255 is used as the value of "h".

The color space converting section 18 sends the image data which are converted into the QMh color space to the color space evaluating section 19 with the environment parameters. The color space evaluating section 19 evaluates the image data by the same method described in the first through third embodiments and sends the image data with the evaluation result to the color space selecting section 17.

Figure 4:
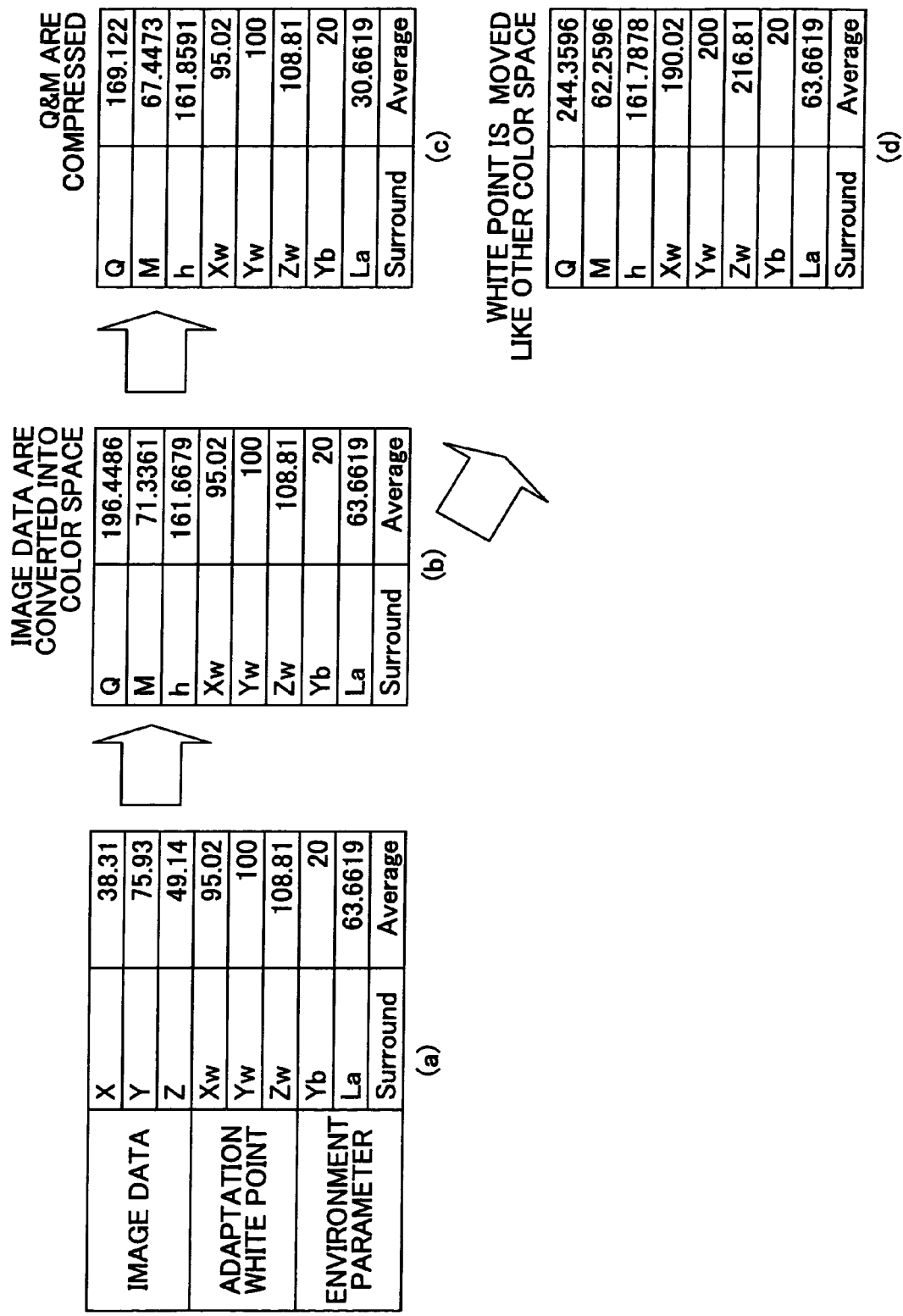
FIG. 4 is a diagram showing a compression example of a distribution range of a color according to a fourth embodiment of the present invention.

When the compression of the distribution range of colors included in the image data is needed, the color space selecting section 17 compresses the distribution range by controlling the environment parameters. In this case, Q and M are compressed. FIG. 4 is a diagram showing a compression example of the distribution range of a color according to the fourth embodiment of the present invention. As shown in FIG. 4(c), the compression is executed by changing the brightness La of the adaptation visual field. In case of the QMh color space, as shown in FIG. 4(d), when the value of the adaptation white point is made large, the M becomes small but the Q becomes large.

As described above, the compressed image data are sent back to the printer controller 11 with the environment parameters as the image data of the QMh color space. The compressed image data are overwritten on the image data to which the conversion has not been applied in the semiconductor memory 12 and the HDD 13. At the time of printing the image data, the same operations as in the second and the third embodiments are executed.

As described above, according to one embodiment of the present invention, in an image processing apparatus in which color manuscript image data read by an image reading unit or color image data input from an image input unit are to be stored in an image storing unit, the following operations can be executed. That is, it is determined whether a color included in the color manuscript image data or in the input color image data is included in a reference color space by comparing and evaluating the color with color spaces such as a device dependent color space, an input data color space, and reference color spaces. At the same time, a frequency distribution in which the number of pixels of the color is included in the reference color space is detected, color control is applied to the input image data based on the comparison and evaluation result and the frequency distribution, and a color space in which the input image data are to be stored is determined. With this, the degradation in the color gamut caused by clipping at the time of storage is restrained and the input image data can be efficiently stored.

In addition, according to one embodiment of the present invention, as the reference color spaces at the time of evaluating the distribution range of colors included in input image data and storing the input image data, other than the CIELAB color space and the CIELUV color space, at least two of the following color spaces are included. That is, as the color spaces, there are sensing amount color spaces (a relative sensing amount color space JCh or an absolute sensing amount color space QMh) such as the sRGB color space, the scRGB color space, the AdobeRGB color space, the ROM-MRGB color space, the sYCC color space, the bg-sRGB color space, the bg-sYCC color space, the Wide Gamut RGB color space, the NTSC color space, and the CIECAM02 color space. With this, the input image data can be stored by comparing and evaluating colors in the color spaces that effectively use the color gamut. Further, quantization errors caused by using excessively large color spaces for storing the input image data can be restrained.

In addition, according to one embodiment of the present invention, when a color space for storing the input image data determined by the evaluation result of the distribution range of colors included in the input image data is an absolute sensing amount color space QMh, the distribution range is compressed by controlling the environment parameters of the input image. Therefore, the distribution range of the colors can be compressed by a unique conversion method without using a complex color gamut compression algorithm.

In addition, according to one embodiment of the present invention, when the color difference equivalent value between the input image data and the color space for storing in which mapping is applied to the input image data is a predetermined value or more, the color space for storing is changed to one rank larger color space. Therefore, tone blurring caused by excessive compression of the distribution range of the colors of the input color image can be prevented, and at the same time, the degradation caused by the mapping can be prevented.

In addition, according to one embodiment of the present invention, as the evaluation indexes of the distribution range of the colors of the input image data, in colors included in the input image data, at least one of the following values is included. That is, the values are a color difference equivalent value from a color at a lattice point in the color space that is closest to a color outside the color space to be compared, and a maximum value or an average value of the minimum color difference between each color of the input image data and a color at the lattice point of a reference color space. Therefore, a suitable color space for storing can be selected in each set of the input image data.

In addition, according to one embodiment of the present invention, the ratio of a color included in the input image data to colors that are included in a color space to be compared or the ratio of a color included in the input image data to colors that are outside the color space to be compared is considered. Therefore, a suitable color space for storing can be selected by considering an area that pixels outside the reference color space occupy in the input image without calculating the color gamut of the input image.

The present invention can be applied to an image processing apparatus in which image data are input and stored, such as a digital still camera, a digital video camera, color facsimile apparatus, an image scanner, a multifunctional peripheral, and so on.

Further, the present invention is not limited to the specifically disclosed embodiments, and variations and modifications may be made without departing from the scope of the present invention.

What is claimed is:

1. An image processing apparatus which stores input image data, comprising:
 a color space evaluating unit to evaluate a color space of the input image data by comparing the color space of the input image data with a reference color space;
 a frequency distribution calculating unit to calculate an appearing frequency distribution of a color included in the input image data; and
 a color space determining unit to determine a determined color space in which the input image data are to be stored by applying color control to the input image data based on the evaluated result by the color space evaluating unit and the calculated result by the frequency distribution calculating unit, wherein:
 the color space determining unit compresses a distribution range of the color included in the input image data as the color control by moving a white point in a direction in which the brightness becomes greater based on the evaluated result when the determined color space is a predetermined color space;
 the color space determining unit does not compress the distribution range of the color included in the input image data and changes the reference color space when the input image data are stored in a storing unit in a case where a maximum value or an average value of the minimum color difference between each color of the input image data of the evaluated result and a color at a lattice point of the reference color space is a predetermined value or more;
 the evaluated result includes values of a color difference equivalent value from a color at a lattice point in the color space which is closest to a color outside the color space to be compared, and a maximum value and an average value of the minimum color difference between each color of the input image data and a color at the lattice point of the reference color space in a color included in the input image data; and
 the frequency distribution is an appealing rate of a color included in the input image data in a color space to be compared or a sticking out rate of a color included in the input image data from a color space to be compared.

2. The image processing apparatus as claimed in claim 1, wherein:
 as the reference color space, other than the CIELAB color space and the CIELUV color space in which the value of the brightness signal is allowed to take less than 0 and 100 or more, at least two or more of a relative sensing amount color space or an absolute sensing amount color space are used from the sRGB color space, the scRGB color space, the AdobeRGB color space, the ROM-MRGB color space, the sYCC color space, the bg-sRGB color space, the bg-sYCC color space, the Wide Gamut RGB color space, the NTSC color space, and the CIECAM02 color space.

3. The image processing apparatus as claimed in claim 1, wherein:
 the color space determining unit compresses the distribution range of the color included in the input image data as the color control by controlling environment parameters based on the evaluated result when the determined color space is the absolute sensing amount color space.

4. An image processing method in an image processing apparatus, comprising the steps of:
 using a color space evaluating unit, executed by a computer, to evaluate a color space of the input image data by comparing the color space of the input image data with a reference color space;
 using a frequency distribution calculating unit, executed by the computer, to calculate an appearing frequency distribution of a color included in the input image data; and
 using a color space determining unit, executed by the computer, to determine a determined color space in which the input image data are to be stored by applying color control to the input image data based on the evaluated result by the color space evaluating unit and the calculated result by the frequency distribution calculating unit, wherein
 the color space determining unit compresses a distribution range of the color included in the input image data as the color control by moving a white point in a direction in which the brightness becomes greater based on the evaluated result when the determined color space is a predetermined color space;

the color space determining unit does not compress the distribution range of the color included in the input image data and changes the reference color space when the input image data are stored in a storing unit in a case where a maximum value or an average value of the minimum color difference between each color of the input image data of the evaluated result and a color at a lattice point of the reference color space is a predetermined value or more;

the evaluated result includes values of a color difference equivalent value from a color at a lattice point in the color space which is closest to a color outside the color space to be compared, and a maximum value and an average value of the minimum color difference between each color of the input image data and a color at the lattice point of the reference color space in a color included in the input image data; and the frequency distribution is an appearing rate of a color included in the input image data in a color space to be compared or a sticking out rate of a color included in the input image data from a color space to be compared.

5. The image processing method as claimed in claim 4, wherein:

as the reference color space, other than the CIELAB color space and the CIELUV color space in which the value of the brightness signal is allowed to take less than 0 and 100 or more, at least two or more of a relative sensing amount color space or an absolute sensing amount color space are used from the sRGB color space, the scRGB color space, the AdobeRGB color space, the ROM-MRGB color space, the sYCC color space, the bg-sRGB color space, the bg-sYCC color space, the Wide Gamut RGB color space, the NTSC color space, and the CIECAM02 color space.

6. The image processing method as claimed in claim 4 wherein:

the color space determining unit compresses the distribution range of the color included in the input image data as the color control by controlling environment parameters based on the evaluated result when the determined color space is the absolute sensing amount color space.

* * * * *